No. 746,975.  PATENTED DEC. 15, 1903.
R. MAYER.
FILM AND PLATE CAMERA.
APPLICATION FILED JULY 27, 1903.
NO MODEL.
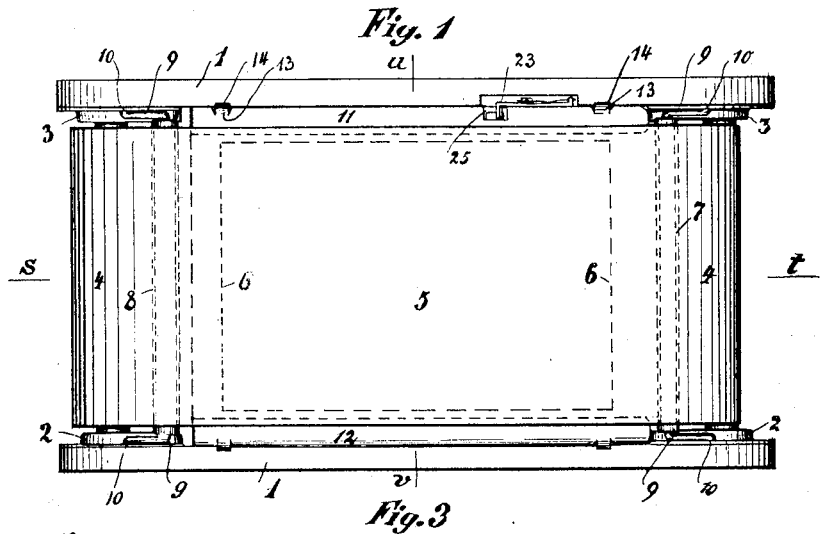
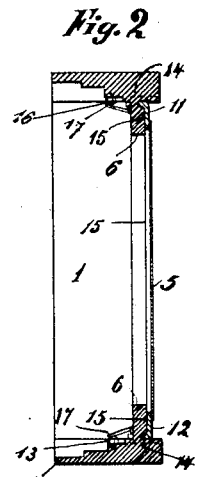
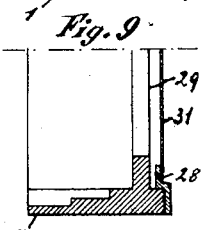
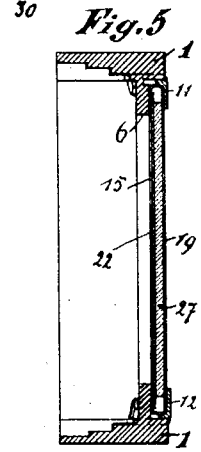
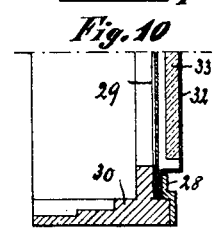
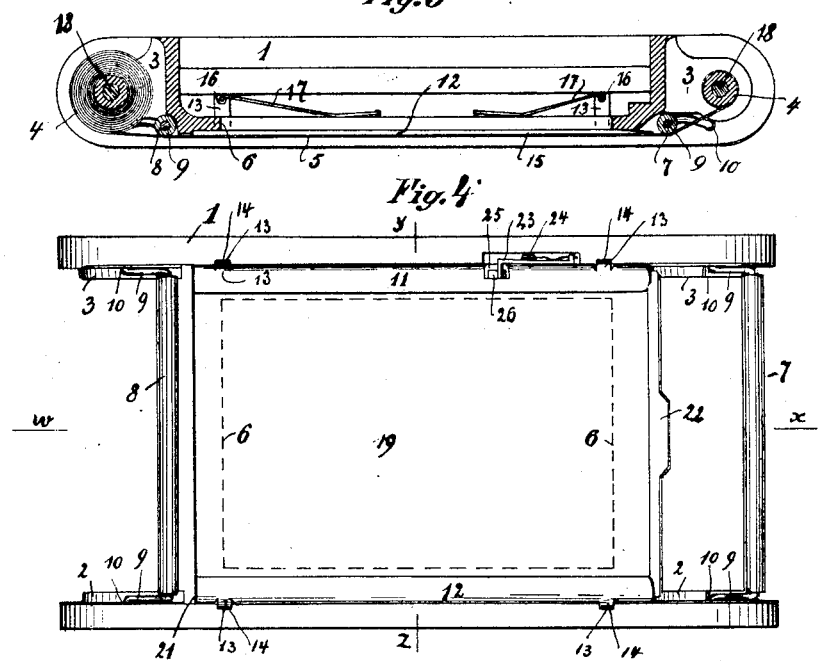
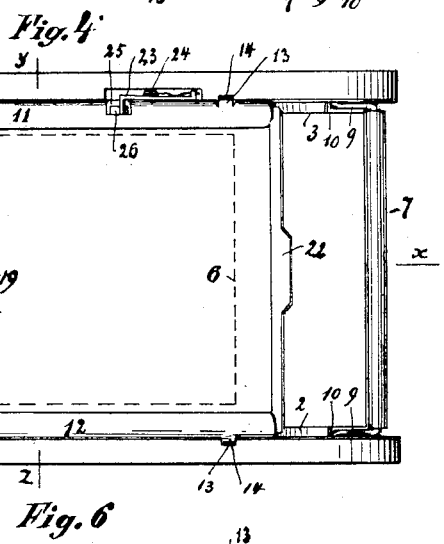
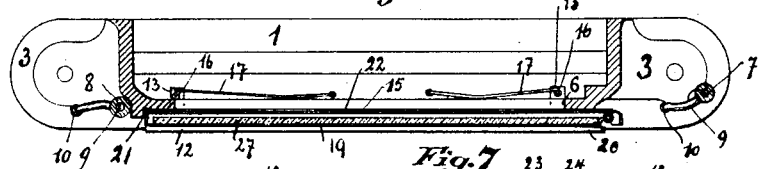
Witnesses:
Inventor: Robert Mayer
by B. Singer, atty.

No. 746,975. Patented December 15, 1903.

UNITED STATES PATENT OFFICE.

ROBERT MAYER, OF SONTHEIM-HEILBRONN, A. N., GERMANY.

FILM AND PLATE CAMERA.

SPECIFICATION forming part of Letters Patent No. 746,975, dated December 15, 1903.

Application filed July 27, 1903. Serial No. 167,148. (No model.)

*To all whom it may concern:*

Be it known that I, ROBERT MAYER, a subject of the King of Würtemberg, residing at Sontheim-Heilbronn, A. N., in the Empire of Germany, have invented new and useful Improvements in Film and Plate Cameras, of which the following is a specification.

This invention relates to improvements in photographic cameras which are adapted to use both films and plates, and is so arranged that either may be used without readjustment of the focal plane. Its objects are to provide a camera of the character indicated, comprising means for the operation of the film and the reception of the plate, and to provide such other novel features as will appear more fully hereinafter. I attain these objects by the arrangements illustrated in the accompanying drawings, in which—

Figure 1 is an elevation of the frame provided with two movable metallic guides, the two film-rolls and the film being put in and the right film-guiding roller occupying its normal position. Fig. 2 is a vertical cross-section through the same on the line $u\ v$ in Fig. 1. Fig. 3 is a horizontal section through the same on the line $s\ t$ in Fig. 1. Fig. 4 is an elevation of the same frame, into which the plate-case is introduced after the right film-guiding roller has been turned aside. Fig. 5 is a vertical cross-section through the same on the line $y\ z$ in Fig. 4. Fig. 6 is a horizontal section through the same on the line $w\ x$ in Fig. 4. Fig. 7 is an elevation of the upper movable metallic guide. Fig. 8 is a top view of the same. Fig. 9 is a vertical cross-section through a part of a frame provided with two fast metallic guides over which a film is guided, and Fig. 10 is a similar section through the same frame part into which a plate-case is introduced.

Similar characters of reference refer to similar parts throughout the several views.

1 denotes a frame, of timber or other suitable material, which is in a known manner affixed to the rear part of a camera and provided with suitable bearings 2 3 for receiving the two film-rolls 4 4. This frame 1 is assumed to be placed horizontally, as shown at Fig. 1; but where so preferred it may also be placed vertically. The film 5 passing over the field of exposure 6 is guided by the two film-guiding rollers 7 8 and is unwound from the one roll 4 and wound on the other roll 4 by hand or by any known mechanism. (Not shown.) Both film-guiding rollers 7 8 are here assumed to be movable. They are mounted to turn on two spindles 9 9, made of wire. The two ends of each spindle 9 are cranked and engage in suitable holes 10 10, provided in the bearings 2 3. Thus the film-guiding rollers 7 8 can be turned aside, as shown on the right in Figs. 4 and 6.

Two movable metallic guides 11 12 of angular cross-section are each provided with two projections 13 13, (see Figs. 7 and 8,) which engage in suitable recesses 14 14 and holes in the frame 1 and are thereby guided in a direction at right angles to the bearing-surface 15 of the frame 1. These projections 13 13 are provided with holes 16 16, into which the conveniently-bent ends of springs 17 17 engage. These springs are affixed to the frame 1 and serve for pressing the movable guides 11 12 against the bearing-surface 15. In these positions the external surfaces of the movable guides 11 12 flush with the tangent to the two film-guiding rollers 7 8—*i. e.*, the focal plane (when adjusted)—or they recede quite slightly therefrom. Then the two edges of the film 5 will touch the two movable guides 11 12 but slightly, as is shown at Fig. 2.

When the film-rolls 4 4, with the film 5, have been removed in any known manner, be it by longitudinally withdrawing their spindles 18 18 or otherwise, an ordinary metallic plate-case 19 can be introduced after the right film-guiding roller 7 has been turned aside, as is shown at Figs. 4 and 6. To facilitate the introduction of the plate-case 19, the frame 1 is preferably beveled off on the right edge at 20, so that spaces are formed by the right ends of the movable guides 11 12, as is best shown at Fig. 3. On introducing the plate-case 19 it will push the guides 11 12 off the bearing-surface 15, after which the plate-case 19 will be held by the guides 11 12. To insure the correct position of the plate-case 19, the frame 1 is preferably provided with a shoulder 21, against which the left edge of this case strikes. To prevent the plate-case 19 from moving on opening it for exposure—*i. e.*, on withdrawing its slide 22—preferably a spring-pressed latch 23 is arranged on the one movable guide 11. (See Figs. 7 and 8.) This latch 23 is mounted to turn on a bolt 24 and engages through an opening 25 of the guide 11 in a suitable notch 26 of the plate-case 19, whereby the latter is secured. For again withdrawing the plate-case 19 it is only necessary to depress the projecting other arm of the latch 23, when the latter will get out of the notch 26, and thus release the plate-case 19. The dry-plate 27 is secured within the case 19 in any known manner (not shown) and is invariably so placed that its actinic side flushes exactly with the tangent to the two film-guiding rollers 7 8 in their normal positions—i. e., with the focal plane, (when adjusted.) Thereby the important advantage is obtained that the camera can be exactly focused, no matter whether films or plates are to be employed. The operator need not entertain any fear of making mistakes as regards the exactitude of the picture to be produced if he inadvertently uses a film in place of plates, or vice versa.

From an examination of Fig. 6 it will be evident that the right film-guiding roller 7 when turned aside will not disturb the slide 22 of the plate-case 19. The left film-guiding roller 8 need not be movable. It may be fast, if so preferred.

The movable right film-guiding roller 7 is of special advantage for the use, as it is never taken off the frame, but remains therein. Thus the number of separate parts to be minded or carried about is reduced. Also the volume of the camera can be restricted, since the guiding-roller 7 does not project in any way on being turned aside.

The movable metallic guides 11 12 may be pressed against the bearing-surface 15 of the frame or against the plate-case 19 by other means than the springs 17 17. For instance, eccentrics of any known description may be arranged on the frame 1 for bearing on the movable guides 11 12 to produce the effects named.

In case thicker plate-cases are to be employed, it will be found more advantageous to fasten the two metallic guides at a certain distance from the bearing-surface of the frame, as is shown, for example, at Figs. 9 and 10. There the metallic guides are denoted by 28, which are so affixed to the frame 30 as to leave a certain space between them and the bearing-surface 29. The film 31 passes over the external surfaces of the guides 28. The edges of the plate-case 32 are introduced between the bearing-surface 29 and the internal surfaces of the guides 28. The dry-plate 33 is again so placed in the plate-case 32 that its actinic side flushes with the external surfaces of the guides 28—i. e., with the focal plane when adjusted.

The arrangements described so far can be varied in many respects without deviating from the spirit of my invention.

What I claim as my invention, and desire to secure by Letters Patent, is—

1. The combination with a frame adapted to be affixed to the rear part of a photographic camera and provided on two opposed sides with two brackets each, of two removable film-rolls adapted to be supported by said four brackets of said frame, two film-guiding rollers, adapted to guide a film passing over the field of exposure from the one to the other of said two film-rolls, two guides of metal and the like arranged on said frame for guiding with their external surfaces the edges of said film, means for turning aside one of said two film-guiding rollers, a plate-case adapted to be introduced between the internal surfaces of said two guides and the bearing-surface of said frame, means for securing said plate-case in said frame, and means for so holding the dry-plate within said plate-case that its actinic side flushes with the external surfaces of said two guides.

2. The combination with a frame adapted to be affixed to the rear part of a photographic camera and provided on two opposed sides with two brackets each, of two removable film-rolls adapted to be supported by said four brackets of said frame, two film-guiding rollers, adapted to guide a film passing over the field of exposure from the one to the other of said two film-rolls, two movable guides of metal and the like, means for guiding said two movable guides in a direction at right angles to the bearing-surface of said frame, means for pressing said two movable guides against the bearing-surface of said frame, so that the edges of said film are guided by the external surfaces of said two movable guides, means for turning aside one of said two film-guiding rollers, a plate-case adapted to be introduced between the bearing-surface of said frame and said two movable guides so that the latter are pushed off and bear with their internal surfaces against the plate-case, and means for securing said plate-case therein, said plate-case being so arranged, that the actinic side of the dry-plate held therein flushes with the tangent to said two film-guiding rollers in their normal positions.

3. The combination with a frame adapted to be affixed to the rear part of a photographic camera and provided on two opposed sides with two brackets each, of two removable film-rolls adapted to be supported by said four brackets of said frame, two spindles, two film-guiding rollers mounted on said two spindles to turn, and adapted to guide a film passing over the field of exposure from the one to the other of said two film-rolls, two movable guides of metal and the like and provided each with two guiding-lugs which engage in suitable recesses and holes in said frame at right angles to its bearing-surface, the ends of said guiding-lugs having each a hole, four springs on said frame which engage in the holes of said lugs of said movable guides for pressing the latter against the bearing-surface of said frame, so that the edges of said film are guided by the external surfaces of said two movable guides, the one of said two spindles having cranked ends which engage in holes in two of said four brackets of said frame so that the film-guiding roller on this spindle can be turned aside with the latter, a plate-case provided with a notch and adapted to be introduced between the bearing-surface of said frame and said two movable guides so that the latter are pushed off and bear with their internal surfaces against the plate-case, and a spring-pressed latch mounted to turn on a bolt on one of said two movable guides, so that the latch engages through an opening in this guide in said notch of said plate-case, said plate-case being so arranged, that the actinic side of the dry-plate held therein flushes with the tangent to said two film-guiding rollers in their normal positions.

In testimony whereof I have signed my name to this specification in the presence of two subscribing witnesses.

ROBERT MAYER.

Witnesses:
ERNST ENTERMAN,
WM. HAHN.